United States Patent
Ramachandran et al.

(10) Patent No.: US 9,930,029 B2
(45) Date of Patent: Mar. 27, 2018

(54) HYPERVISOR AGNOSTIC BIDIRECTIONAL SECURE CHANNEL FOR GUEST AGENT TRANSPORT

(71) Applicant: Nutanix, Inc., San Jose, CA (US)

(72) Inventors: Parthasarathy Ramachandran, Palo Alto, CA (US); Karthik Chandrasekaran, Bangalore (IN); Bharat Kumar Beedu, Santa Clara, CA (US); Akshay Anant Deodhar, Cupertino, CA (US); Simon Martin Mijolovic, Newport, NY (US)

(73) Assignee: Nutanix, Inc., San Jose, CA (US)

( * ) Notice: Subject to any disclaimer, the term of this patent is extended or adjusted under 35 U.S.C. 154(b) by 189 days.

(21) Appl. No.: 15/053,473

(22) Filed: Feb. 25, 2016

(65) Prior Publication Data

US 2017/0250976 A1    Aug. 31, 2017

(51) Int. Cl.
*H04L 29/06* (2006.01)
*G06F 9/455* (2018.01)
*G06F 7/04* (2006.01)
*G06F 15/16* (2006.01)
*G06F 17/30* (2006.01)

(52) U.S. Cl.
CPC ...... *H04L 63/0823* (2013.01); *G06F 9/45545* (2013.01); *G06F 9/45558* (2013.01); *H04L 63/1441* (2013.01); *G06F 2009/45579* (2013.01); *G06F 2009/45587* (2013.01)

(58) Field of Classification Search
None
See application file for complete search history.

(56) References Cited

U.S. PATENT DOCUMENTS 5,828,833 A * 10/1998 Belville ............... G06F 9/547
726/11
8,601,473 B1    12/2013 Aron et al.
(Continued)

OTHER PUBLICATIONS

"How RPC Works", Mar. 28, 2003, 7 pages url: https://technet.microsoft.com/en-us/library/cc738291)v=ws.10).aspx.
(Continued)

*Primary Examiner* — Eric Chen
(74) *Attorney, Agent, or Firm* — Vista IP Law Group, LLP

(57) ABSTRACT

Systems, methods, and computer readable medium for virtualized computing environments. A method for providing a connection between a guest virtual machine and a service virtual machine uses driver code functions to establish a listening port on the service virtual machine without providing a listening port on the guest virtual machine. The guest virtual machine initiates a remote procedure call socket between itself and the service virtual machine over a secure, hardened port. The service virtual machine presents an authority certificate by encoding into the authority certificate identifying information received from the guest virtual machine. The service virtual machine makes available (e.g., as an ISO image) the authority certificate, which is used to establish new secure connections. Communications continue, where some communications are initiated by the service virtual machine over the hardened port, and some communications are initiated on-demand by the guest virtual machine over newly-established and authenticated secure RPC connections.

18 Claims, 10 Drawing Sheets

(56) References Cited

U.S. PATENT DOCUMENTS

| | | | |
|---|---|---|---|
| 2007/0016904 A1 | 1/2007 | Adlung et al. | |
| 2007/0016945 A1* | 1/2007 | Bassett | H04L 63/0263 726/11 |
| 2008/0155208 A1 | 6/2008 | Hiltgen et al. | |
| 2009/0063691 A1* | 3/2009 | Kalofonos | H04L 63/102 709/229 |
| 2009/0282471 A1* | 11/2009 | Green | H04L 63/029 726/12 |
| 2012/0331461 A1* | 12/2012 | Fries | H04L 67/2861 718/1 |
| 2013/0132951 A1 | 5/2013 | Shah | |
| 2013/0311832 A1* | 11/2013 | Lad | H04L 41/042 714/37 |
| 2014/0359146 A1* | 12/2014 | Metzler | H04L 65/1069 709/228 |
| 2015/0150114 A1* | 5/2015 | Kuker | H04L 12/4641 726/14 |
| 2016/0021218 A1 | 1/2016 | Smith | |
| 2016/0352840 A1* | 12/2016 | Negron | H04L 67/16 |
| 2017/0034310 A1* | 2/2017 | Victorelli | H04L 67/40 |

OTHER PUBLICATIONS

International Search Report and Written Opinion dated May 15, 2017 for corresponding PCT Application No. PCT/US17/19109, 10 pages.

\* cited by examiner

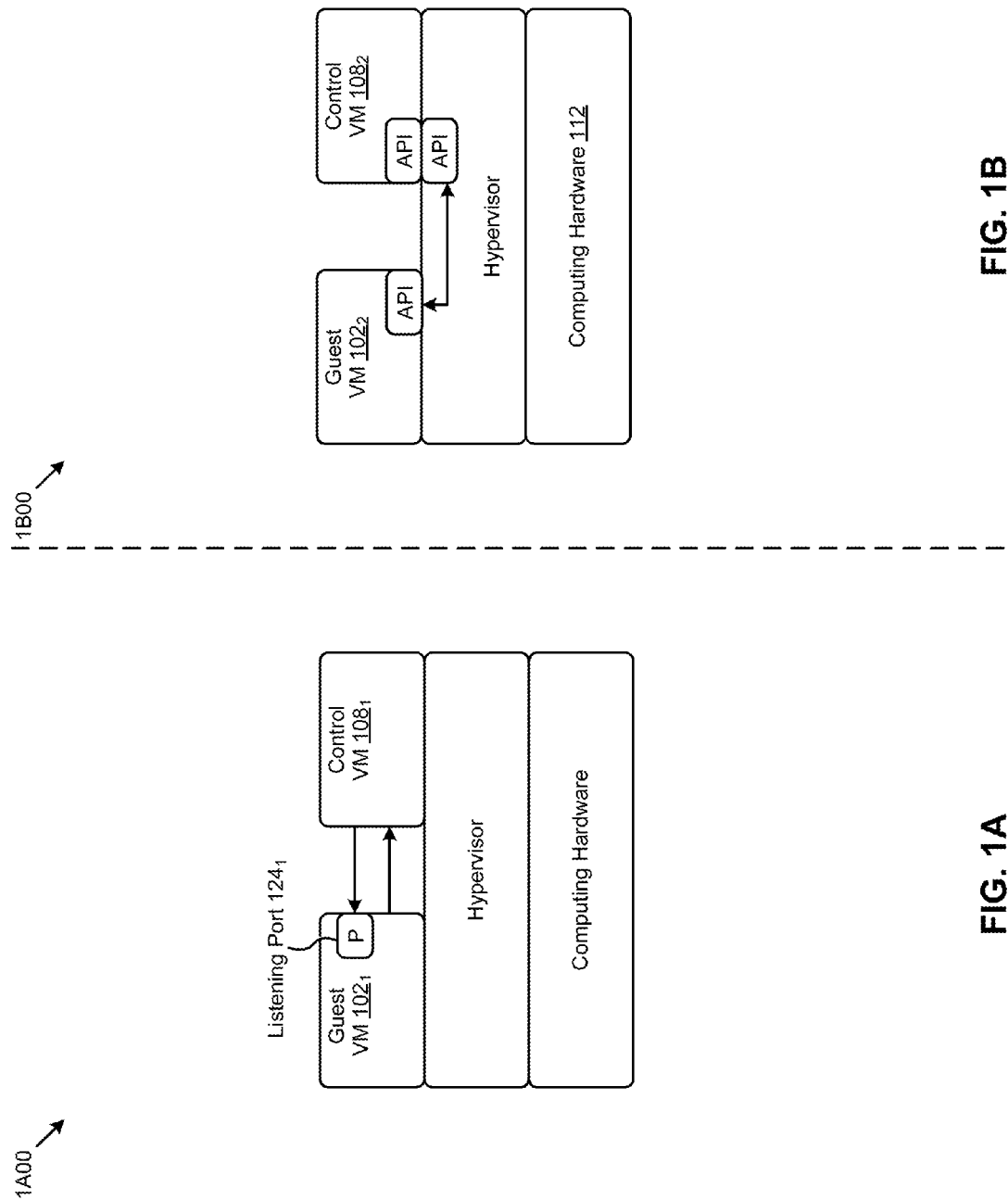

HYPERVISOR AGNOSTIC BIDIRECTIONAL SECURE CHANNEL FOR GUEST AGENT TRANSPORT

FIELD

This disclosure relates to virtualized computing environments, and more particularly to techniques for setting-up a hypervisor agnostic channel for secure guest agent communications.

BACKGROUND

Many modern computing environments are connected to a network (e.g., a LAN, a wireless network, a WAN, the Internet, etc.). Merely connecting to a network introduces risk of cyber-centric malicious acts such as virus introduction, data theft, denial of service attacks, etc. Connection to such networks are unavoidable in certain settings. For example, an application or applications that run in middleware settings or in the cloud most likely perform at least some communication over the network. In some cases the aforementioned application or applications listen on specific ports for incoming communications (e.g., from a requestor), and respond accordingly (e.g., return a result). The mere presence of a listening port is a vulnerability since a malicious agent could send a barrage of requests (e.g., denial-of-service or other malicious requests) to the listening port, and the listening application could become overwhelmed by the malicious traffic—thus denying service to legitimate requestors.

In some situations, a component that is connected a network is "hardened" against malicious cyber activity, sometimes through port filtering, and sometimes through additional components (e.g., hardware and/or software) that sanitize or otherwise process traffic before damage can be done or to thwart denial of service. Such "hardening" works well when the hardening techniques are integrated into the listening component. However, in many modern computing settings such as in a virtualized environment, user virtual machines might not have the sophistication and/or resources required to ensure such hardening, yet there needs to be some mechanism in place such that user virtual machines are immune to denial of service attacks, while still being able to perform bi-directional communications with service providers in the virtualization environment. For example, a user virtual machine might want to take advantage of services provided by a hypervisor or by a specially-configured ancillary control process.

Unfortunately, legacy designs introduce the situation that a user virtual machine (e.g., a guest process) use a listening port to communicate with another virtual machine (e.g., an ancillary control process), and to do so, the user virtual machine has only legacy techniques to rely on. In one legacy approach to avoiding having an open listening port in the user virtual machine, the user virtual machine communicates through a hypervisor "back door" programming interface that does not use network I/O. Another legacy technique is to integrate "hardening" into each user virtual machine, however such legacy techniques that integrate "hardening" into each user virtual machine are difficult to deploy and manage, at least in that integrating "hardening" into each user virtual machine is far too resource intensive, and at least in that integrating "hardening" into each user virtual machine creates a management problem in that any change in the code to provide hardening would need to be deployed to each user virtual machine. Also, legacy techniques that rely on a hypervisor "back door" application programming interface (API) is deficient at least in that such an API is not hypervisor agnostic, thus setting up the management scenario where each instance of an ancillary control process would have to be configured to operate with a particular hypervisor. What is needed is a way to deploy hypervisor agnostic channels for secure guest agent communications: (1) while not requiring a listening port to be opened in the user virtual machine, (2) while not requiring that hardening capabilities be built into the user virtual machine, and (3) while remaining hypervisor-independent.

What is needed is a technique or techniques to improve over legacy approaches.

BRIEF DESCRIPTION OF THE DRAWINGS

The drawings described below are for illustration purposes only. The drawings are not intended to limit the scope of the present disclosure.

FIG. 1A depicts an unhardened listening port communication technique.

FIG. 1B depicts a hypervisor-specific backdoor communication technique.

DETAILED DESCRIPTION

Figure 1C:
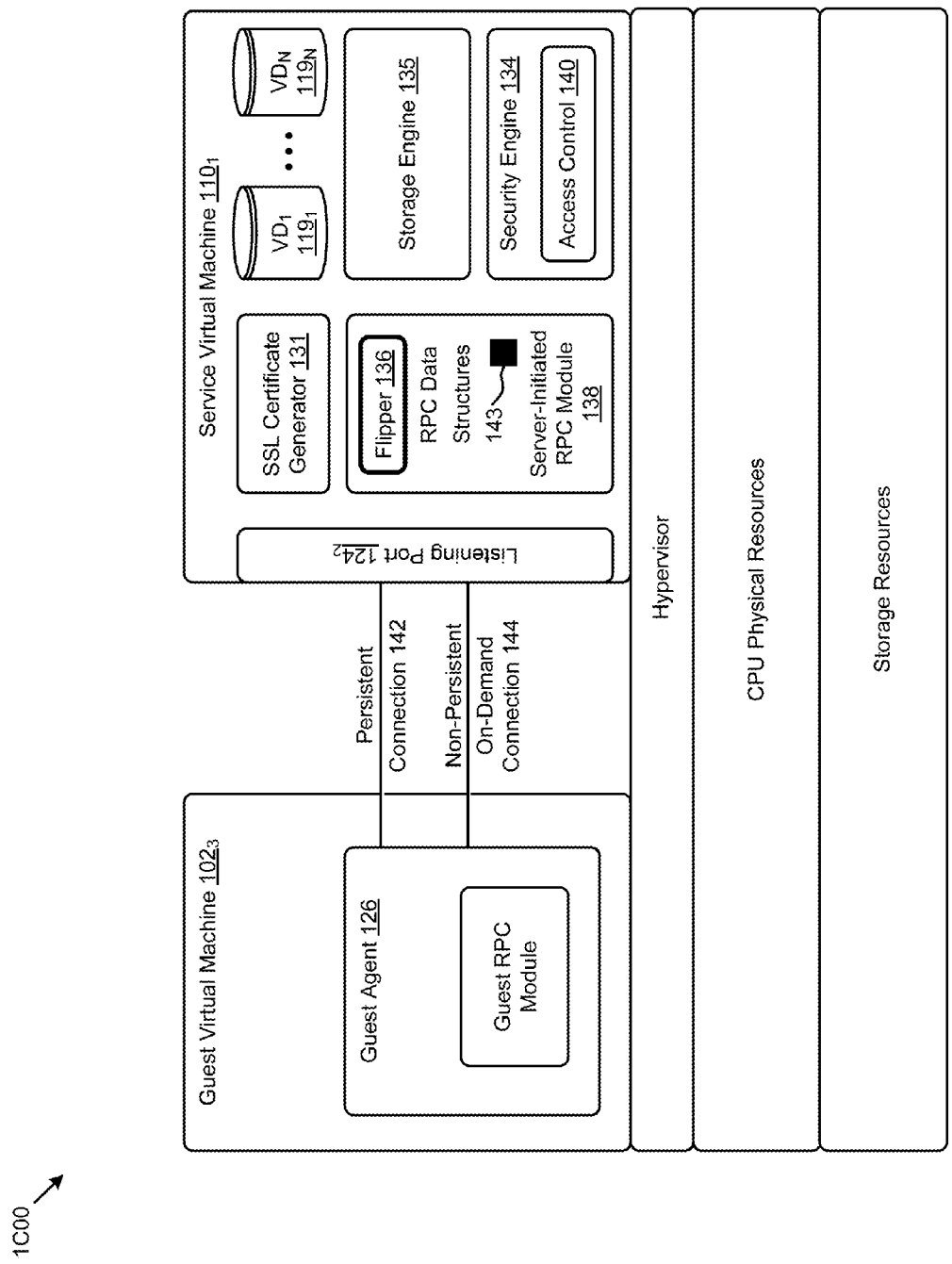
FIG. 1C depicts a virtualized platform that uses an inverted listening port protocol to implement a hypervisor agnostic channel for secure guest agent communications, according to an embodiment.

Some embodiments of the present disclosure address the problems attendant to how to open listening ports in guest virtual machines without introducing cyber-vulnerabilities. Some embodiments are directed to approaches for implementing a flipped communication protocol that does not open listening ports on guest virtual machines. More particularly, disclosed herein and in the accompanying figures are exemplary environments, systems, methods, and computer program products for opening a hypervisor agnostic channel for secure guest agent communications.

Overview

In today's virtualized platforms, there is a need to have in-guest agents to perform a variety of tasks. Ways for an external entity (e.g., a virtualized server) to communicate with a guest virtual machine guest include:
 1. Through a hypervisor back door;
 2. Via an IP network.

Unfortunately, a hypervisor back door is not platform agnostic as it relies on hypervisor-specific application programming interfaces (APIs), and IP network communications is not secure, when there is a listening port open on the guest virtual machine.

Disclosed herein are (1) mechanisms by which an external entity (e.g., a service virtual machine) can communicate with the guest agent, without opening a port on the guest, (2) mechanisms by which inter-server communications can be made to be secure, and (3) mechanisms by which the service virtual machine can initiate communications with this guest agent and vice versa.

Some embodiments include mechanisms where a guest agent is installed into the image of a guest virtual machine. The guest agent commences to initiate two connections with the server: (1) a first connection, referred to herein as a persistent connection, and (2) an on-demand connection. Once initialized, the persistent connection is used for communication from the server to the guest agent. The on-demand connection is used to communicate between the guest agent and the server. The protocol to establish the persistent connection includes communication of packet that that incorporates an instruction to the server to "flip" the connection. More specifically, the server notes in its data structures that the persistent connection should be used for remote procedure calls (RPCs) from the server to the guest agent. Configuration changes are made in the RPC layer so that an existing TCP connection can be used for an RPC. This technique implements a server initiated remote procedure call (RPC) connection. Moreover, the server initiated remote procedure call results in providing a communication link between the guest and the service virtual machine without requiring a listening port on the guest.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, references throughout this specification to "some embodiments" or "other embodiments" refers to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts an unhardened listening port communication technique 1A00. As shown, a service virtual machine (e.g., a control VM $108_1$) communicates with another virtual machine (e.g., guest VM $102_1$) through a network (e.g., an internet protocol network). The shown technique includes an IP port P (e.g., listening port $124_1$) that is open to any communication over the network. For example, and as shown, the listening port $124_1$ can receive communications from the control VM $108_1$. Additionally, the listening port $124_1$ is an open listening port and can receive and respond to communications that originate from any IP sender. Such a listening port introduces vulnerabilities, at least in the aspect that the guest VM must process IP communications that are routed to it. A malicious actor might send unwanted IP communications to the open listening port in an attempt to maliciously deny service to any legitimate (e.g., non-malicious) actors. For example, suppose that the guest VM $102_1$ is configured to take a snapshot with some periodicity. A malicious actor might send unwanted IP communications to the open listening port of the guest VM $102_1$ with the same or similar periodicity. The unwanted IP communications can maliciously deny or hamper the performance snapshot service activities. Some inter-process techniques avoid use of an IP listening port at the guest VM, and instead use a hypervisor-specific communication technique.

FIG. 1B depicts a hypervisor-specific backdoor communication technique 1B00. As shown, a service virtual machine (e.g., a control VM $108_2$) communicates with another virtual machine (e.g., guest VM $102_2$) through the hypervisor using application programming interfaces (APIs). This technique can be implemented in many environments. For example, the API-enabled "backdoor" has the characteristic that almost any variation of the computing hardware 112 can be used. However, significantly, this technique is dependent on the availability of application programming interfaces as defined by the specific hypervisor. Moreover, both the control VM $108_2$ as well as the guest VM $102_2$ implement at least a portion of the hypervisor API. The reliance on the APIs as in this backdoor communication technique has the side effect that neither the control VM $108_2$ nor the guest VM $102_2$ can be hypervisor agnostic.

FIG. 1C depicts a virtualized platform 1C00 that uses an inverted listening port protocol to implement a hypervisor agnostic channel for secure guest agent communications. As an option, one or more variations of virtualized platform 1C00 or any aspect thereof may be implemented in the context of the architecture and functionality of the embodiments described herein. Also, the virtualized platform 1C00 or any aspect thereof may be implemented in any environment.

The embodiment shown in FIG. 1C is merely one example of a virtualized platform that relies on channel for secure guest agent communications with a control VM. In this example, the service virtual machine $110_1$ is configured to perform various storage-related functions on behalf of a guest virtual machine. For example, a service virtual machine may abstract interactions between a guest virtual machine and storage devices. In some cases, a service virtual machine may handle complex, and sometime multi-protocol interactions, to and from storage devices over a network. In some situations, a storage access layer is provided to federate I/O to and/or from the storage devices. In such a manner, many different storage device types and layout and connectivity, etc. can be addressed so as to facilitate storage-related use cases such as snapshotting.

Since the service virtual machine is connected to the aforementioned network, it is open to cyber vulnerabilities. Often such a service virtual machine is connected to the network behind a firewall or other "hardening". Often such a service virtual machine is regularly updated with firewall updates, virus abatement functions, and/or other cyber-hardening. However, guest VMs are often not similarly configured, and in some cases guest VMs are necessarily lightweight, possibly so lightweight to the extent that such a lightweight VM has no cyber hardening at all. The detractions of inter-process communication following the techniques of FIG. 1A and FIG. 1B, gives rise to the need for cyber-save inter process communications between a guest VM and a control VM.

An inverted listening port protocol to implement a hypervisor agnostic channel for secure guest agent communications can be deployed as follows:

The guest VM integrates a lightweight guest agent (e.g., guest agent 126) into the code space of the guest VM. This can be accomplished using a linker-loader, or by a plug-in, or by forms of just-in-time compiled modules, or any known technique.

The guest agent initiates two connections with the server. One of these two connections shown as the persistent connection 142. The other connection is shown as the non-persistent, on-demand connection 144. The connections can be authenticated using a secure socket layer (SSL) certificate (see FIG. 2)

The persistent connection is used for communication from the server VM to the guest agent within the guest VM.

The on-demand connection is used to communicate between the guest agent and the server (e.g., without providing a listening port on the guest virtual machine).

The shown service virtual machine implements a listening port $124_2$, and to provide cyber-hardening, the service virtual machine also implements a security engine 134, which can in turn interface with an SSL certificate generator 131 as well as access control functions (see access control 140).

In some deployments, such as storage-centric deployments, a service virtual machine supports the creation and maintenance of virtual disks (e.g., see $VD_1$ $119_1$, $VD_N$ $119_N$, etc.), possibly using a storage engine 135. Such a storage engine 135 interfaces with any of a range of storage devices that provide physical storage and/or abstractions of the underlying storage. Storage devices can include any number of storage servers. Various use cases (e.g., taking snapshots of virtual disks) might involve accesses to storage devices. As it relates to timely capture of virtual disk snapshots, denial of service by a malicious actor is to be avoided. Secure guest agent communications are needed.

Figure 3:
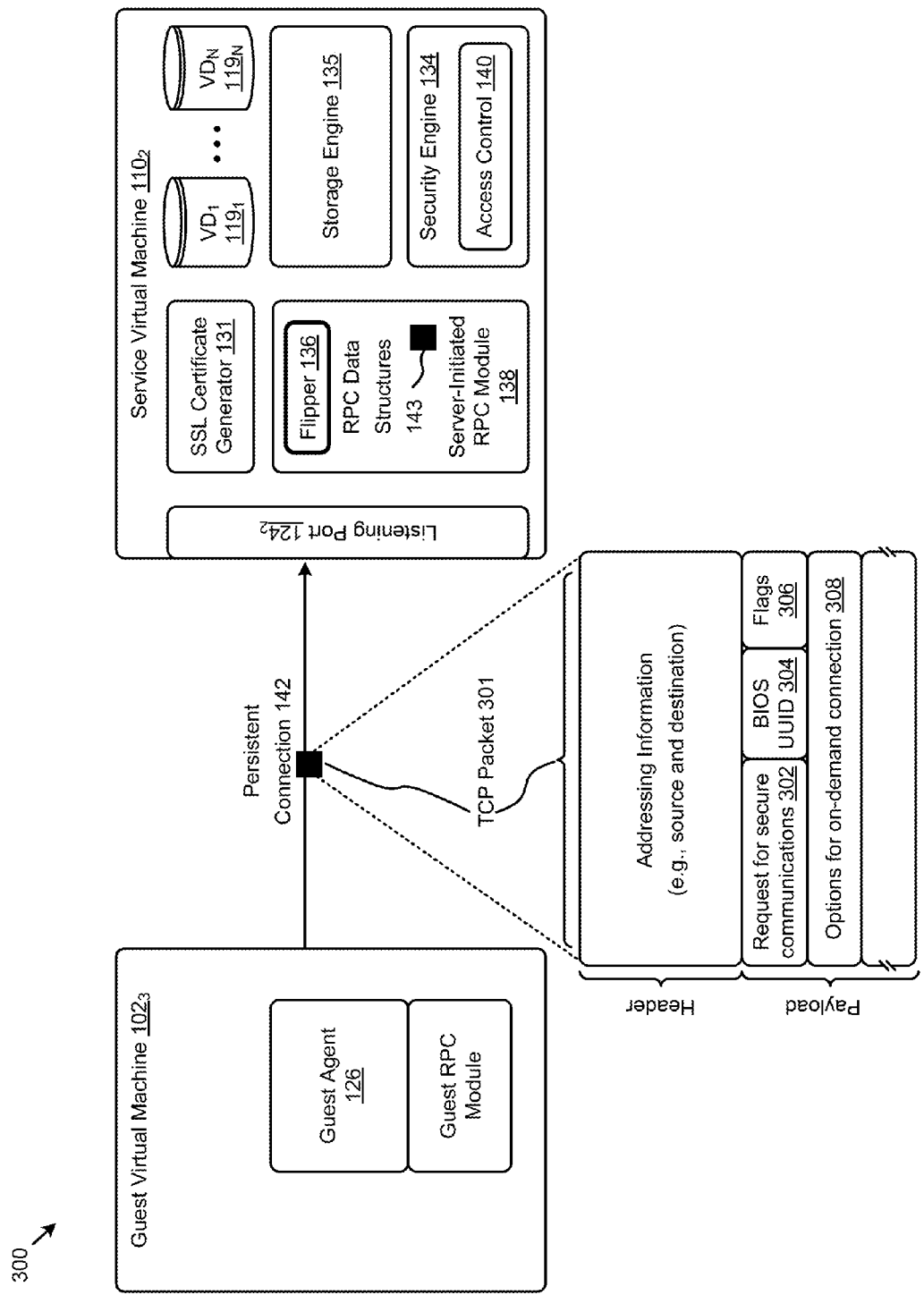
FIG. 3 presents a sample set of inter-VM communications for requesting a hypervisor agnostic channel, according to an embodiment.

Returning the discussion of inter-process communications between as guest VM and a control VM, the herein-disclosed protocol to establish the persistent connection 142 can include one or more communications (e.g., between a guest agent 126 and a flipper 136) that include commands formatted into the payload portion of an IP packet (see FIG. 3). The command instructs the flipper 136 to "flip" the sense of the connection (also see FIG. 3). More specifically, the server notates in its data structures (e.g., RPC data structures 143) that the connections between a guest VM and the control VM, should be used for RPCs from the control VM to the guest agent. The appropriate changes are made in the RPC layer so that an existing TCP connection can be used for remote process calls. Such a flipped connection can be used as a server initiated RPC connection.

Further, RPC facilities, such as facilities provided within the server-initiated RPC module 138 can provide context multiplexing for connection-oriented connections (e.g., connections that use Transmission Control Protocol (TCP)). This allows the RPC server to negotiate multiple security contexts over a single connection. Further, RPC server programs can use dynamic port mappings to avoid conflicts with programs and protocols registered in the range of well-known TCP ports. In the context of this embodiment, a flipper 136 can associate a universally unique identifier (UUID) with a dynamic port.

Figure 2:
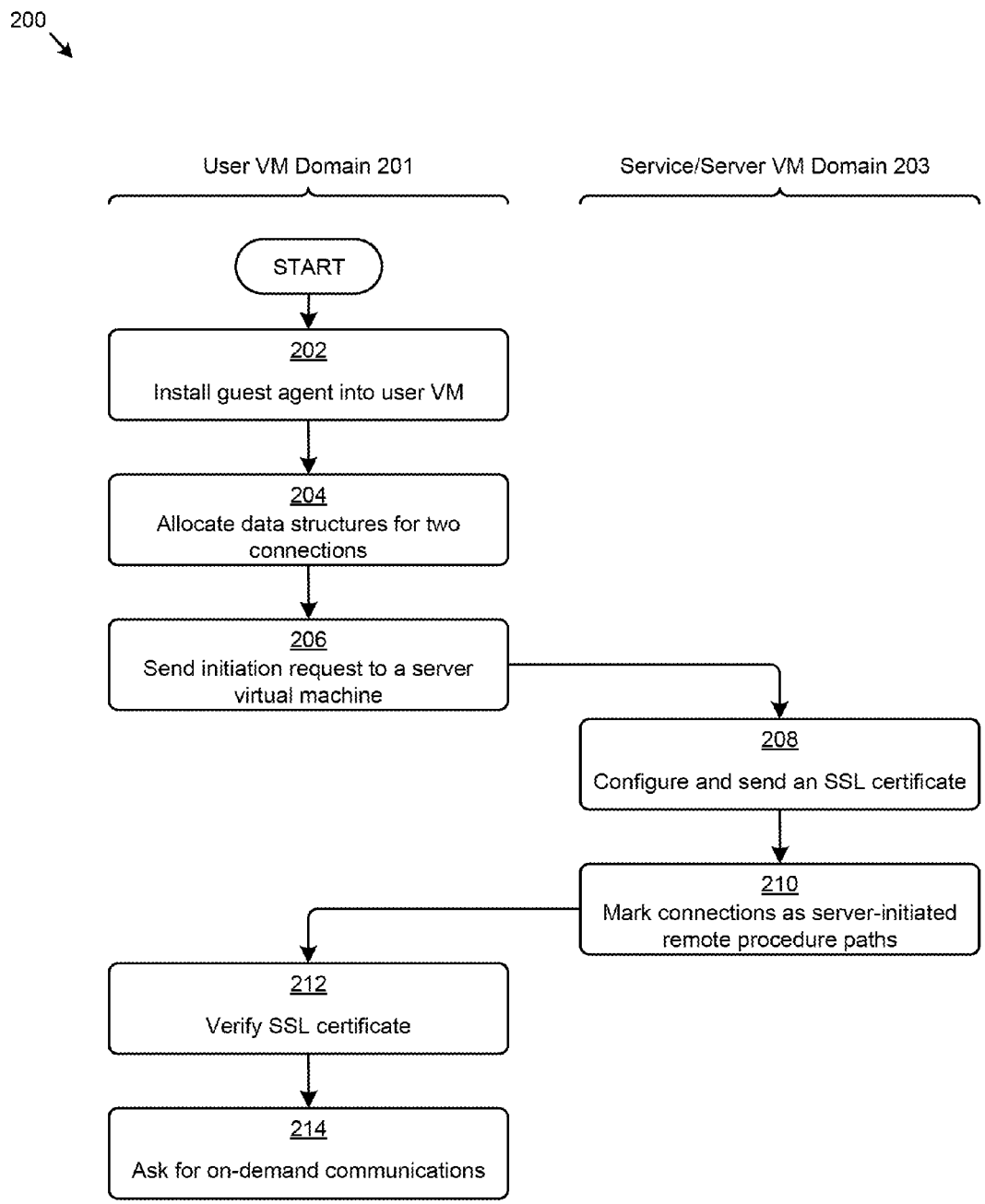
FIG. 2 exemplifies a series of steps of a connection set-up technique used to implement a hypervisor agnostic channel for secure guest agent communications, according to some embodiments.

FIG. 2 exemplifies a series of steps of a connection set-up technique 200 used to implement a hypervisor agnostic channel for secure guest agent communications. As an option, one or more variations of connection set-up technique 200 or any aspect thereof may be implemented in the context of the architecture and functionality of the embodiments described herein. Also, the connection set-up technique 200 or any aspect thereof may be implemented in any environment.

The embodiment shown in FIG. 2 includes a user VM domain 201 and a control VM domain 203. As shown, a user VM starts the series of steps by installing the guest agent into the guest VM (see step 202). Autonomously, or under direction by the guest VM, data structures for connections are allocated (see step 204) and a request for a flipped communication channel is sent to the server VM (see step 206). An SSL certificate that has been generated by an authority is configured for use by the requestor, and written into an ISO image for secure access by the requestor (see step 208). More specifically, the requestor can use hypervisor-provided ISO mounting capabilities. In exemplary environments, the aforementioned hypervisor is hardened against malicious attacks, thus the IOS-attach technique is secure.

The server VM, continues to processes the request from the guest agent, and initializes at least one of the connections as being a flipped connection so as to form a server-initiated RPC connection (see step 210). The guest agent or other operational unit in the user VM domain verifies the received SSL certificate (see step 212). Thereafter, the user VM can request communication with the server VM by requesting on-demand communications (see step 214).

FIG. 3 presents a sample set of inter-VM communications 300 for requesting a hypervisor agnostic channel. As an option, one or more variations of inter-VM communications 300 or any aspect thereof may be implemented in the context of the architecture and functionality of the embodiments described herein. Also, the inter-VM communications 300 or any aspect thereof may be implemented in any environment.

The embodiment shown in FIG. 3 depicts a guest virtual machine $102_3$ that is in communication with a service virtual machine $110_2$. In the depiction, there is no listening port open at the guest virtual machine, however in operation, the guest virtual machine performs activities that would be facilitated by network connections between the guest virtual machine and the service virtual machine. In the embodiment of FIG. 3, the guest virtual machine uses the aforementioned persistent connection 142 to send a TCP packet 301 to the service virtual machine. The TCP packet is formed by a header (e.g., comprising addressing information pertaining to the service virtual machine) that is followed by some payload. The payload includes a request for secure communications 302, an indication (e.g., possibly encoded) of the BIOS UUID 304 of the requestor, a set of flags 306, and a set of options pertaining to the soon-to-be-established on demand connection 308. When the TCP packet is received by the service virtual machine, is it routed to a flipper 136, possibly using the nature and facilities of listening port $124_2$. The flipper, possibly in conjunction with ancillary modules (e.g., the shown SSL Certificate generator 131) will in turn carry out operations and messaging as heretofore described (e.g., see connection set-up technique 200). More particularly, a SSL certificate that has been generated by an authority can be configured (e.g., encoded) using the BIOS UUID 304 of the requestor. Such a technique of using the BIOS UUID 304 when generating an SSL certificate can be used by the service virtual machine to verify authentication of the initiator of packets that come into the service virtual machine through listening port $124_2$.

As pertaining to the requesting guest virtual machine, when that particular virtual machine (e.g., through the facilities of its guest agent 126) concludes the protocol to establish a hypervisor agnostic channel, the service virtual machine can thenceforth verify the authentic identity of incoming traffic from that virtual machine. Network traffic that is incoming into the service virtual machine can be allowed or rejected based on the pre-authentication. As such, the ability for the service virtual machine to authenticate the identity of incoming traffic serves multiple purposes: (1) Network traffic that is incoming into the service virtual machine with a signed and verified SSL certificate can be allowed with confidence, (2) Network traffic that is incoming into the service virtual machine without a signed and verified SSL certificate can be denied with confidence, and (3) Network-delivered access requests that are incoming into the service virtual machine with a signed and verified SSL certificate can be allowed or denied based on the scope of ownership (e.g., by the requestor) of the resources pertaining to the access requests. Multiple layers of security be implemented at the access control level. Strictly as one example, the server service virtual machine can confirms that any requested operation sent by the guest agent can only affect entities that are owned by the requestor. Conversely, access requests (e.g., READ requests, WRITE requests, DELETE requests, etc.) from a guest virtual machine to operate over and/or mutate an entity that it does not own will be rejected by the service virtual machine.

Figure 4:
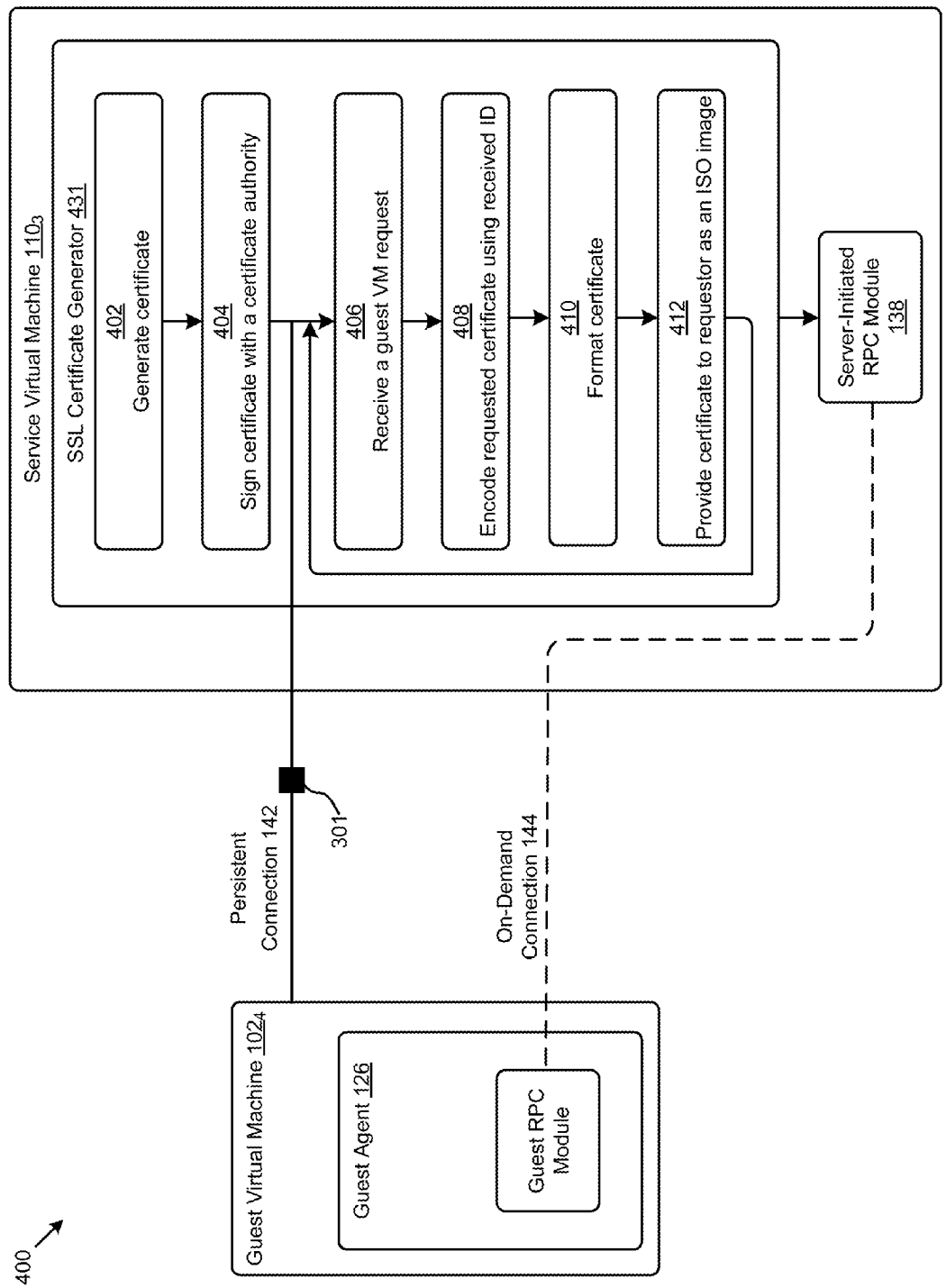
FIG. 4 exemplifies a secure on-demand connection generation technique as used when setting up a hypervisor agnostic channel for secure guest agent communications, according to some embodiments.

FIG. 4 exemplifies a secure on-demand connection generation technique 400 as used when setting up a hypervisor agnostic channel for secure guest agent communications. As an option, one or more variations of the secure on-demand connection generation technique 400 or any aspect thereof may be implemented in the context of the architecture and functionality of the embodiments described herein. Also, the secure on-demand connection generation technique 400 or any aspect thereof may be implemented in any environment.

The foregoing presentation and discussion of FIG. 3 shows and describes a technique for a guest virtual machine $102_4$ to request a hypervisor agnostic channel for secure guest agent communications. One result from the processing of such a request is the establishment of an on-demand connection 144. Prior to establishing the non-persistent on-demand connection, the guest VMs can communicate to the service virtual machine $110_3$ only by the persistent connection. Such a persistent connection can be held open by the service VM, Security is managed by hardening. For example, a service virtual machine can comprise a security engine that is regularly updated with threat detection updates, virus abatement functions, and/or other cyber-hardening. However, as earlier indicated guest VMs are often not similarly configured, and in some cases guest VMs are necessarily lightweight. The secure on-demand connection generation technique described here includes: (1) SSL certificate generation, (2) secure SSL certificate delivery, (3) SSL-based authentication, and (4) authenticated access control.

The embodiment shown in FIG. 4 is merely one example. The secure on-demand connection generation handled by enhancing the handshake to pass in SSL certs. As shown, a component of the service virtual machine $110_3$ generates per-VM certificates, signs them with a CA, and then provides the certificate to the requesting VM via ISO. Certificates can be handed out in the clear (e.g., over ISO), since the private key of the certificate never leaves the server. As previously indicated, certificate can be encoded with the requesting VM's BIOS UUID. In other circumstances, the certificate can be encoded based on other identifying information. The identifying information and the encoding technique used is maintained by the certificate generator. As such, when a guest agent communicates with a service virtual machine (e.g., the certificate generator) the service virtual machine can access the signature and/or identifying information so as to verify the identity of requestor. The transmission itself and/or and demands or characteristics of any constituent requests can be allowed or rejected.

Referring again to FIG. 4, the SSL certificate generator 431 can generate the certificate (see step 402), sign it using a certificate authority (see step 404), and then wait for an incoming request (e.g., over the persistent connection 142). Upon receipt (see step 406) and parsing of the TCP packet 301 (e.g., comprising payload comprising a request for secure communications), the SSL certificate generator 431 encodes the certificate (see step 408) with identifying information, then formats the certificate (see step 410) so as to deliver to the requestor as an ISO image (see step 412).

An instance of the server-initiated RPC module 138 has access to the certificate. The certificate is delivered to the guest via an automated ISO-attach. Communications can be initiated using remote procedure calls from the guest. A listening port on the guest VM is not needed since a persistent and secure connection (e.g., an authenticated connection) has now been established using the server-initiated RPC connection.

Figure 5:
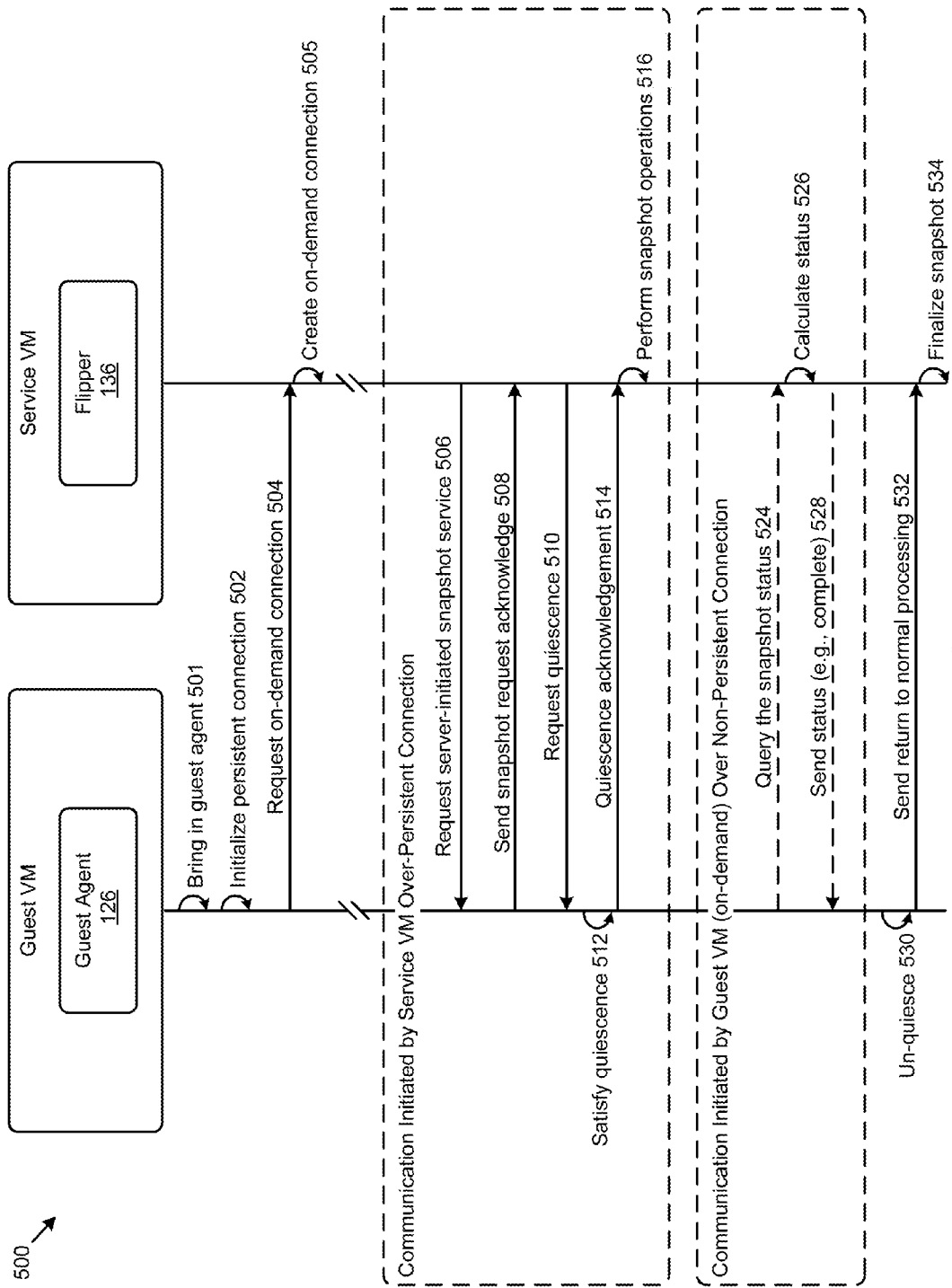
FIG. 5 presents a snapshot generation use case that relies on a hypervisor agnostic channel for secure guest agent communications, according to an embodiment.

FIG. 5 presents a snapshot generation use case 500 that relies on a hypervisor agnostic channel for secure guest agent communications. As an option, one or more variations of snapshot generation use case 500 or any aspect thereof may be implemented in the context of the architecture and functionality of the embodiments described herein. Also, the snapshot generation use case 500 or any aspect thereof may be implemented in any environment.

The use case shown in FIG. 5 depicts merely one example of use of a hypervisor agnostic channel for secure guest agent communications. The shown guest VM engages in an exchange of messages with a service VM. The shown series of operations and messages begins when the guest VM brings in a lightweight guest agent (e.g., guest agent 126) into it execution environment (see operation 501). The guest VM initializes the persistent connection (see operation 502). Then, using the lightweight guest agent, the guest VM requests an on-demand connection (see message 504). The service VM creates the requested on-demand connection (see operation 505), possibly using a flipper 136 or another computing element that can manage connection data structures.

At some point in time, the service VM might initiate snapshot activities, and in doing so, may request the guest VM to participate in the server-initiated snapshot service (see operation 506). The guest VM will acknowledge the request (see message 508), after which the server will request quiescence (see message 510). The guest VM satisfies the quiescence request (see operation 512) and sends an acknowledgement (see message 514). The server commences to perform snapshot operations (see operation 516). At some moment, the guest VM might want to check on the status of the snapshot—at least since the guest VM is observing storage I/O quiescence. The guest VM uses the earlier-established on-demand connection to query the snapshot status (see message 524). The service VM calculates the status (see operation 526) or otherwise sends a back a response, again using the earlier-established on-demand connection (see message 528). In the case that the snapshot status is "complete", the guest VM will un-quiesce (see operation 530) and advise the service VM return to normal processing (see message 532). The shown protocol ends when the service VM finalizes the snapshot (see operation 534).

Additional Embodiments of the Disclosure

Additional Practical Application Examples

Figure 6A:
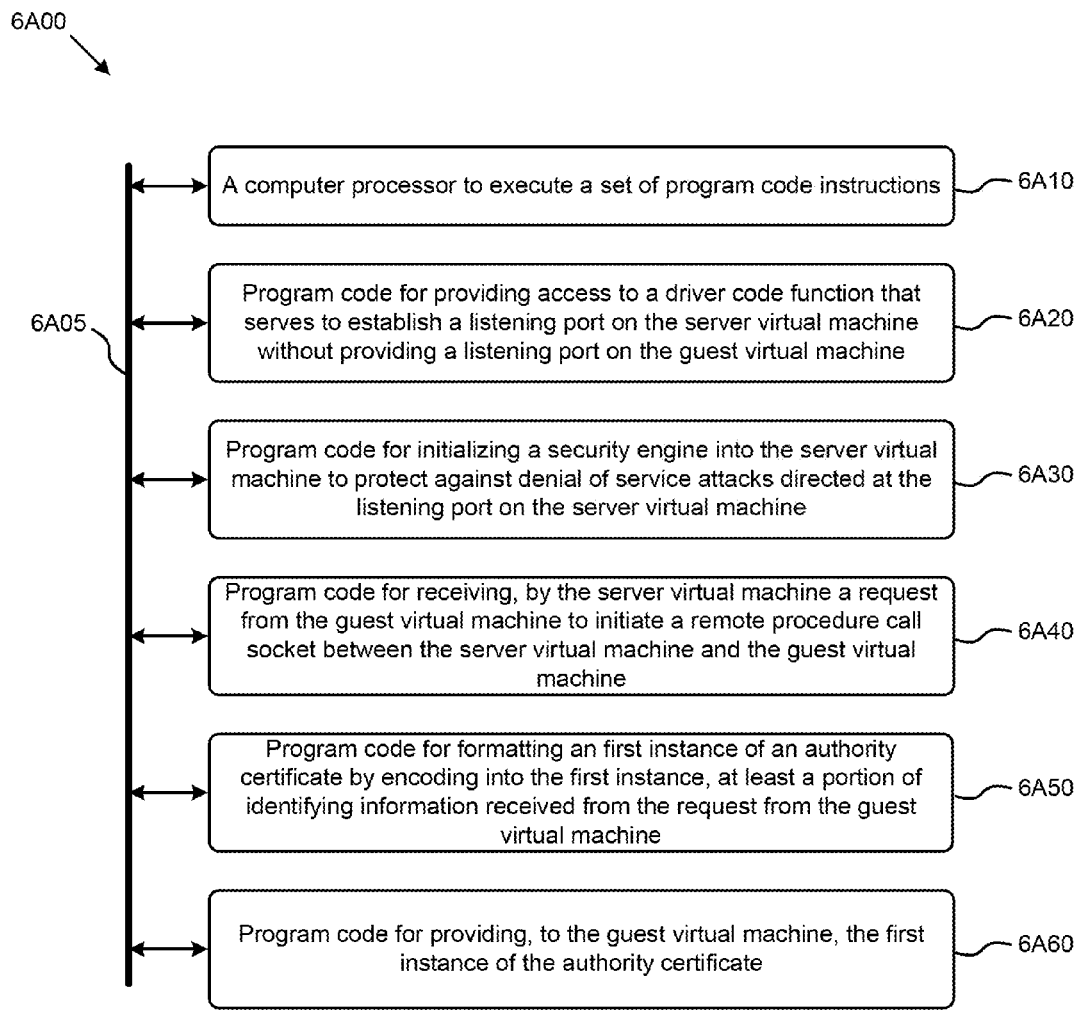
FIG. 6A and FIG. 6B depict system components as arrangements of computing modules that are interconnected so as to implement certain of the herein-disclosed embodiments.

FIG. 6A depicts a system 6A00 as an arrangement of computing modules that are interconnected so as to operate cooperatively to implement certain of the herein-disclosed embodiments. The partitioning of system 6A00 is merely illustrative and other partitions are possible. As an option, the present system 6A00 may be implemented in the context of the architecture and functionality of the embodiments described herein. Of course, however, the system 6A00 or any operation therein may be carried out in any desired environment. The system 6A00 comprises at least one processor and at least one memory, the memory serving to store program instructions corresponding to the operations of the system. As shown, an operation can be implemented in whole or in part using program instructions accessible by a module. The modules are connected to a communication path 6A05, and any operation can communicate with other operations over communication path 6A05. The modules of the system can, individually or in combination, perform method operations within system 6A00. Any operations performed within system 6A00 may be performed in any order unless as may be specified in the claims. The shown embodiment implements a portion of a computer system, presented as system 6A00, comprising a computer processor to execute a set of program code instructions (see module 6A10) and modules for accessing memory to hold program code instructions to perform: providing access to a driver code function that serves to establish a listening port on the service virtual machine without providing a listening port on the guest virtual machine (see module 6A20); initializing a security engine within the service virtual machine to protect against denial of service attacks directed at the listening port on the service virtual machine (see module 6A30); receiving, by the service virtual machine a request from the guest virtual machine to initiate a remote procedure call socket between the service virtual machine and the guest virtual machine (see module 6A40); formatting an first instance of an authority certificate by encoding into the first instance, at least a portion of identifying information received from the request from the guest virtual machine (see module 6A50); and providing, to the guest virtual machine, the first instance of the authority certificate (see module 6A60).

Figure 6B:
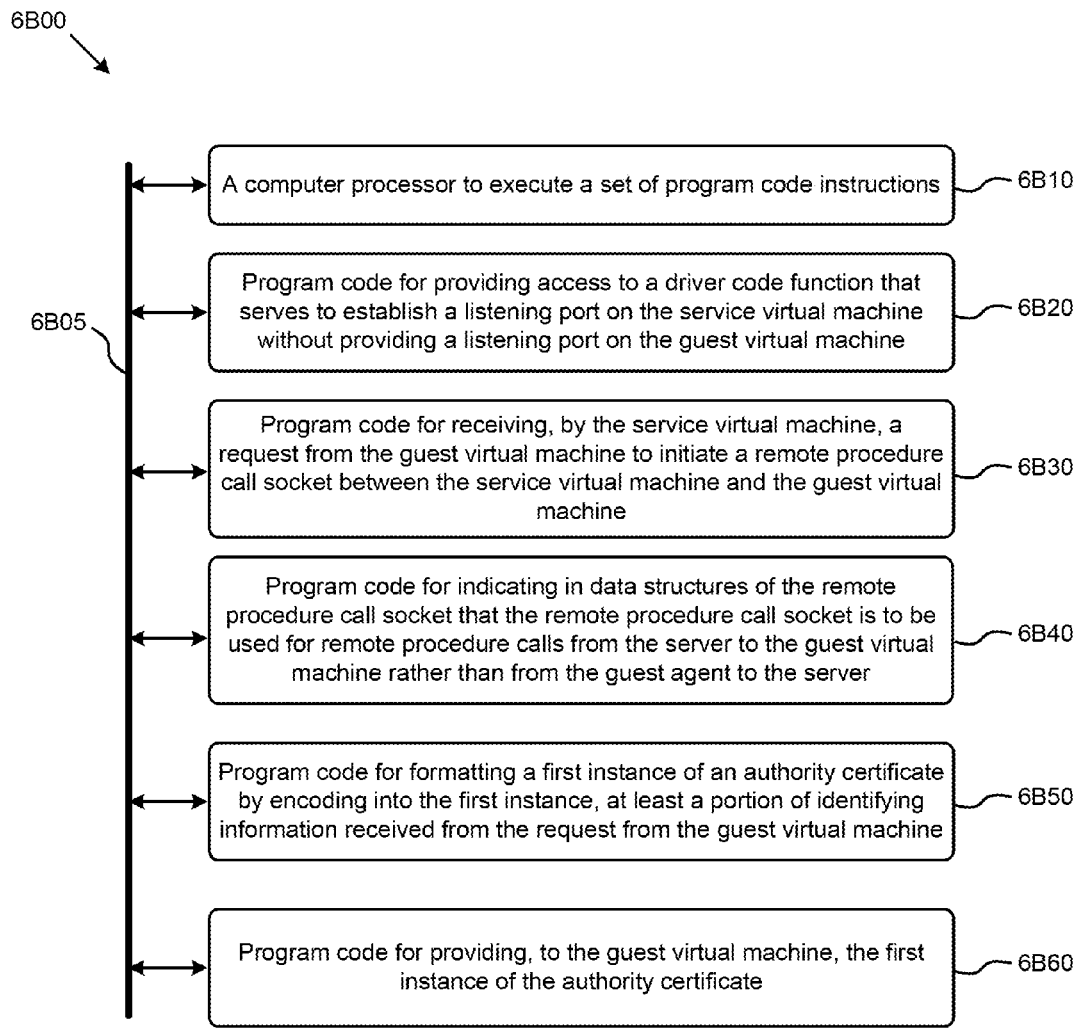

FIG. 6B depicts a system 6B00 as an arrangement of computing modules that are interconnected so as to operate cooperatively to implement certain of the herein-disclosed embodiments. As an option, the system 6B00 may be implemented in the context of the architecture and functionality of the embodiments described herein. Of course, however, the system 6B00 or any operation therein may be carried out in any desired environment. The system 6B00 comprises at least one processor and at least one memory, the memory serving to store program instructions corresponding to the operations of the system. As shown, an operation can be implemented in whole or in part using program instructions accessible by a module. The modules are connected to a communication path 6B05, and any operation can communicate with other operations over communication path 6B05. The modules of the system can, individually or in combination, perform method operations within system 6B00. Any operations performed within system 6B00 may be performed in any order unless as may be specified in the claims. The shown embodiment implements a portion of a computer system, presented as system 6B00, comprising a computer processor to execute a set of program code instructions (see module 6B10) and modules for accessing memory to hold program code instructions to perform: providing access to a driver code function that serves to establish a listening port on the service virtual machine without providing a listening port on the guest virtual machine (see module 6B20); receiving, by the service virtual machine, a request from the guest virtual machine to initiate a remote procedure call socket between the service virtual machine and the guest virtual machine (see module 6B30); indicating in data structures of the remote procedure call socket that the remote procedure call socket is to be used for remote procedure calls from the server to the guest virtual machine rather than from the guest agent to the server (see module 6B40); formatting a first instance of an authority certificate by encoding into the first instance, at least a portion of identifying information received from the request from the guest virtual machine (see module 6B50); and providing, to the guest virtual machine, the first instance of the authority certificate (see module 6B60).

System Architecture Overview

Additional System Architecture Examples

Figure 7A:
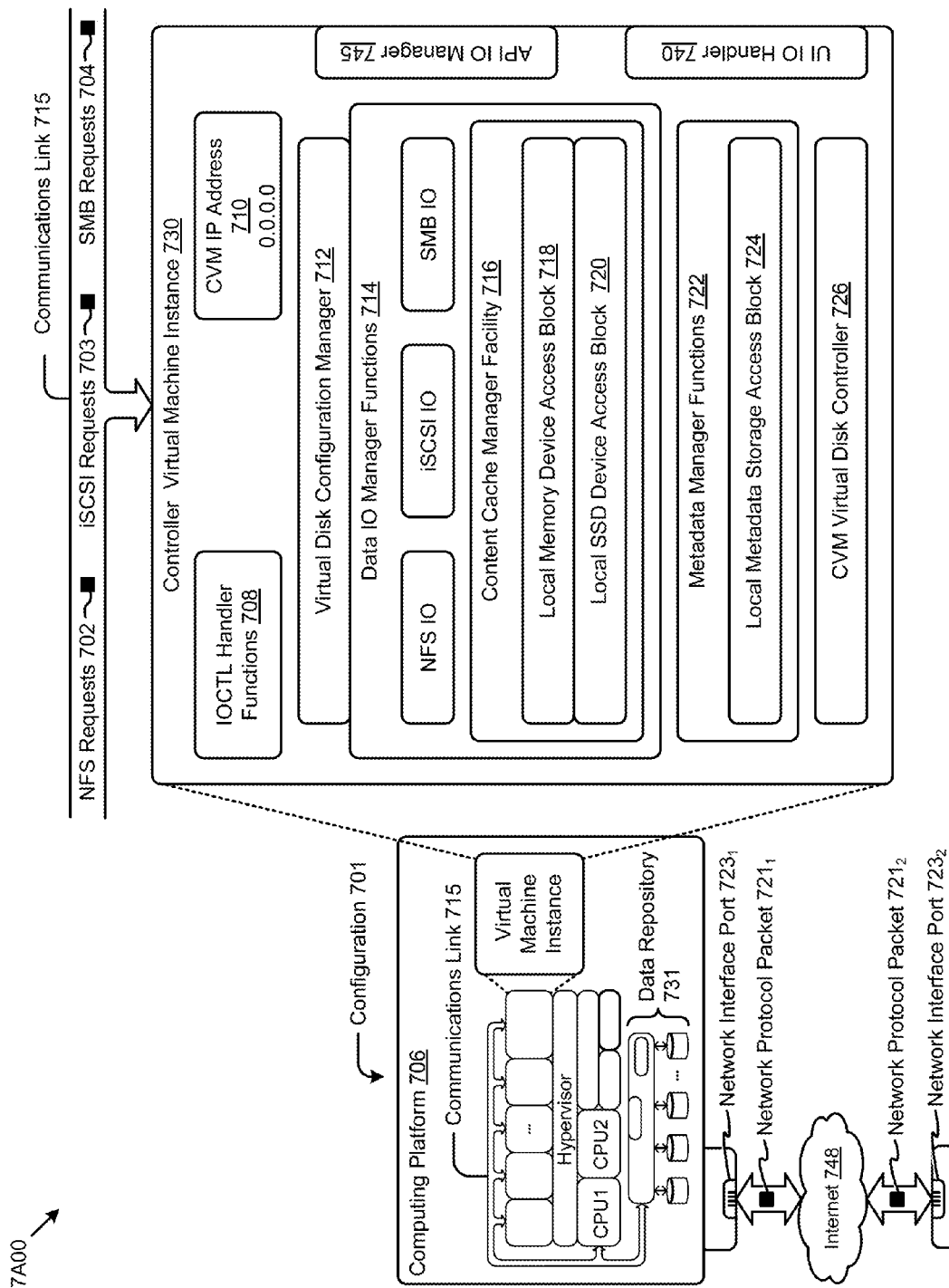
FIG. 7A and FIG. 7B depict architectures comprising collections of interconnected components suitable for implementing embodiments of the present disclosure and/or for use in the herein-described environments.

FIG. 7A depicts a virtual machine architecture 7A00 comprising a collection of interconnected components suitable for implementing embodiments of the present disclosure and/or for use in the herein-described environments. The shown virtual machine architecture 7A00 includes a virtual machine instance in a configuration 701 that is further described as pertaining to the controller virtual machine instance 730. A controller virtual machine instance receives block IO storage requests as of network file system (NFS) requests in the form of NFS requests 702, and/or internet small computer storage interface (iSCSI) block IO requests in the form of iSCSI requests 703, and/or Samba file system requests (SMB) in the form of SMB requests 704. The controller virtual machine instance publishes and responds to an internet protocol (IP) address (e.g., see CVM IP address 710. Various forms of input and output (TO) can be handled by one or more IO control handler IOCTL handler functions 708 that interface to other functions such as data IO manager functions 714, metadata manager functions 722. As shown, the data IO manager functions can include communication with a virtual disk configuration manager 712, and/or can include direct or indirect communication with any of various block IO functions (e.g., NFS IO, iSCSI IO, SMB IO, etc.).

In addition to block IO functions, the configuration 701 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through the shown API IO manager 745.

The communications link 715 can be configured to transmit (e.g., send, receive, signal, etc.) any types of communications packets comprising any organization of data items. The data items can comprise a payload data area as well as a destination address (e.g., a destination IP address), a source address (e.g., a source IP address), and can include various packetization (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions a data processor for execution. Such a medium may take many forms including, but not limited to, non-volatile media and volatile media. Non-volatile media includes, for example, solid state storage devices (SSD), or optical or magnetic disks such as disk drives or tape drives. Volatile media includes dynamic memory such as a random access memory. As shown, the controller virtual machine instance 730 includes a content cache manager facility 716 that accesses storage locations, possibly including local DRAM (e.g., through the local memory device access block 718) and/or possibly including accesses to local solid state storage (e.g., through local SSD device access block 720).

Further details regarding general approaches to configuring and deploying virtual machines are described in U.S. Pat. No. 8,601,473 titled "ARCHITECTURE FOR MANAGING I/O AND STORAGE FOR A VIRTUALIZATION ENVIRONMENT" which is hereby incorporated by reference in its entirety.

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes, or any RAM, PROM, EPROM, FLASH-EPROM, or any other memory chip or cartridge. Any data can be stored, for example, in any form of external data repository 731, which in turn can be formatted into any one or more storage areas, and which can comprise parameterized storage accessible by a key (e.g., a filename, a table name, a block address, an offset address, etc.). An external data repository 731, can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 724. The external data repository 731, can be configured using a CVM virtual disk controller 726, which can in turn manage any number or any configuration of virtual disks.

Execution of the sequences of instructions to practice certain embodiments of the disclosure are performed by a one or more instances of a processing element such as a data processor, or such as a central processing unit (e.g., CPU1, CPU2). According to certain embodiments of the disclosure, two or more instances of configuration 701 can be coupled by a communications link 715 (e.g., backplane, LAN, PTSN, wired or wireless network, etc.) and each instance may perform respective portions of sequences of instructions as may be required to practice embodiments of the disclosure The shown computing platform 706 is interconnected to the Internet 748 through one or more network interface ports (e.g., network interface port $723_1$ and network interface port $723_2$). The configuration 701 can be addressed through one or more network interface ports using an IP address. Any operational element within computing platform 706 can perform sending and receiving operations using any of a range of network protocols, possibly including network protocols that send and receive packets (e.g., see network protocol packet $721_1$ and network protocol packet $721_2$).

The computing platform 706 may transmit and receive messages that can be composed of configuration data, and/or any other forms of data and/or instructions organized into a data structure (e.g., communications packets). In some cases, the data structure includes program code instructions (e.g., application code), communicated through Internet 748 and/or through any one or more instances of communications link 715. Received program code may be processed and/or executed by a CPU as it is received and/or program code may be stored in any volatile or non-volatile storage for later execution. Program code can be transmitted via an upload (e.g., an upload from an access device over the Internet 748 to computing platform 706). Further, program code and/or results of executing program code can be delivered to a particular user via a download (e.g., a download from the computing platform 706 over the Internet 748 to an access device).

The configuration 701 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor. Some embodiments include one or more special-purpose hardware components (e.g., power control, logic, sensors, transducers, etc.). A module may include one or more state machines and/or combinational logic used to implement or facilitate the operational and/or performance characteristics pertaining to setup and ongoing uses of the herein-disclosed hypervisor agnostic channel for secure guest agent communications.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of secure hypervisor agnostic channels). Such files or records can be brought into and/or stored in volatile or non-volatile memory.

Figure 7B:
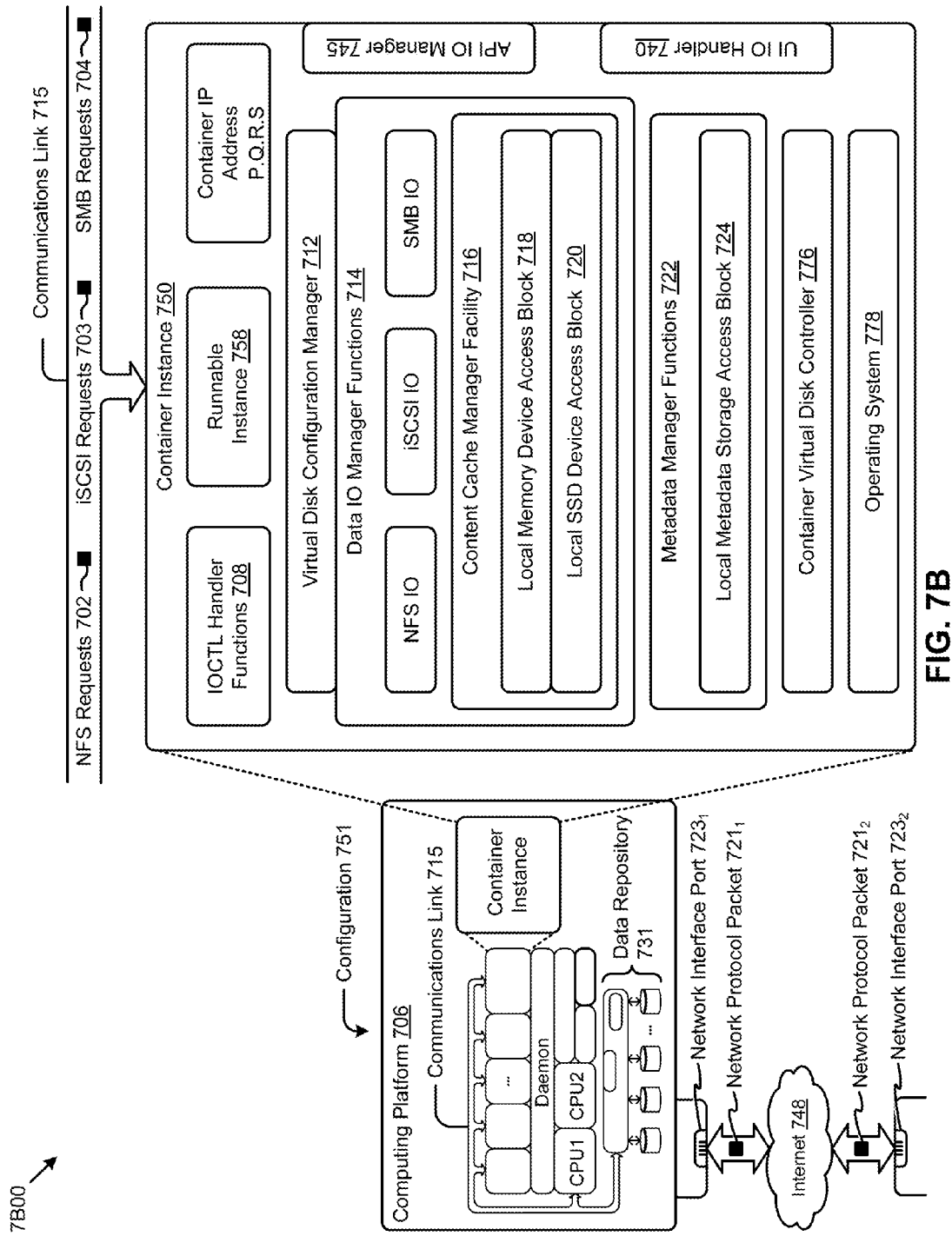

FIG. 7B depicts a containerized architecture 7B00 comprising a collection of interconnected components suitable for implementing embodiments of the present disclosure and/or for use in the herein-described environments. The shown containerized architecture 7B00 includes a container instance in a configuration 751 that is further described as pertaining to the container instance 750. The configuration 751 includes a daemon (as shown) that performs addressing functions such as providing access to external requestors via IP address (e.g., "P.Q.R.S", as shown), a protocol specification (e.g., "http:") and possibly port specifications. The daemon can perform port forwarding to the container. A container can be rooted in a directory system, and can be accessed by file system commands (e.g., "ls" or "ls-a", etc.). The container might optionally include an operating system, however such an operating system need not be provided. Instead, a container can include a runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to a container virtual disk controller 776. Such a container virtual disk controller can perform any of the functions that the aforementioned CVM virtual disk controller 726, yet such a container virtual disk controller does not rely on a hypervisor or any particular operating system 778 in order to perform its range of functions.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for providing a connection between a guest virtual machine and a service virtual machine comprising:
    providing access to a driver code function that serves to establish a listening port on the service virtual machine without providing a listening port on the guest virtual machine;
    receiving, by the service virtual machine, a request from the guest virtual machine to initiate a remote procedure call socket between the service virtual machine and the guest virtual machines;
    indicating, in data structures of the remote procedure call socket, that the remote procedure call socket is to be used for remote procedure calls from the service virtual machine to the guest virtual machine rather than from the guest virtual machine to the service virtual machine;
    formatting a first instance of an authority certificate by encoding into the first instance, at least a portion of identifying information received from the request from the guest virtual machine, wherein the authority certificate authority is generated using a certificate authority; and
    providing, to the guest virtual machine, the first instance of the authority certificate.

2. The method of claim 1, wherein the request from the guest virtual machine comprises a BIOS UUID.

3. The method of claim 1, further comprising delivering the first instance of the authority certificate to the guest virtual machine.

4. The method of claim 3, wherein the authority certificate is presented as an ISO image for secure access by the guest virtual machine.

5. The method of claim 3, further comprising receiving, from the guest virtual machine, a second instance of the authority certificate for creating a secure persistent connection.

6. The method of claim 3, further comprising initiating, by the service virtual machine, a set of snapshot activities.

7. The method of claim 6, further comprising sending, by the service virtual machine, a quiescence request.

8. The method of claim 6, further comprising initiating, by the guest virtual machine, a set of snapshot activities.

9. The method of claim 6, further comprising initiating, by the guest virtual machine, a status query pertaining to the snapshot activities.

10. A computer readable medium, embodied in a non-transitory computer readable medium, the non-transitory computer readable medium having stored thereon a sequence of instructions which, when stored in memory and executed by a processor causes the processor to perform a set of acts for providing a connection between a guest virtual machine and a service virtual machine, the acts comprising:
    providing access to a driver code function that serves to establish a listening port on the service virtual machine without providing a listening port on the guest virtual machine;

receiving, by the service virtual machine, a request from the guest virtual machine to initiate a remote procedure call socket between the service virtual machine and the guest virtual machine;

indicating, in data structure of the remote procedure call socket, that the remote procedure call socket is to be used for remote procedure calls from the service virtual machine to the guest virtual machine rather than from the guest virtual machine to the service virtual machine;

formatting a first instance of an authority certificate by encoding into the first instance, at least a portion of identifying information received from the request from the guest virtual machine, wherein the authority certificate is generated using a certificate authority; and providing, to the guest virtual machine, the first instance of the authority certificate.

11. The computer readable medium of claim 10, wherein the request from the guest virtual machine comprises a BIOS UUID.

12. The computer readable medium of claim 10, further comprising instructions which, when stored in memory and executed by the processor causes the processor to perform acts of delivering the first instance of the authority certificate to the guest virtual machine.

13. The computer readable medium of claim 10, wherein the authority certificate is presented as an ISO image for secure access by the guest virtual machine.

14. The computer readable medium of claim 10, further comprising instructions which, when stored in memory and executed by the processor causes the processor to perform acts of receiving, from the guest virtual machine, a second instance of the authority certificate for creating a secure persistent connection.

15. The computer readable medium of claim 10, further comprising instructions which, when stored in memory and executed by the processor causes the processor to perform acts of initiating, by the service virtual machine, a set of snapshot activities.

16. The computer readable medium of claim 15, further comprising instructions which, when stored in memory and executed by the processor causes the processor to perform acts of sending, by the service virtual machine, a quiescence request.

17. A system for providing a connection between a guest virtual machine and a service virtual machine comprising:

a memory having stored thereon a sequence of instructions; and a hardware processor that executes the instructions to cause the hardware processor to perform a set of acts, the acts comprising, providing access to a driver code function that serves to establish a listening port on the service virtual machine without providing a listening port on the guest virtual machine;

receiving, by the service virtual machine, a request from the guest virtual machine to initiate a remote procedure call socket between the service virtual machine and the guest virtual machine;

indicating, in data structures of the remote procedure call socket, that the remote procedure call socket is to be used for remote procedure calls from the service virtual machine to the guest virtual machine rather than from the guest virtual machine to the service virtual machine;

formatting a first instance of an authority certificate by encoding into the first instance, at least a portion of identifying information received from the request from the guest virtual machine, wherein the authority certificate is generated using a certificate authority; and providing, to the guest virtual machine, the first instance of the authority certificate.

18. The system of claim 17, wherein the request from the guest virtual machine comprises a BIOS UUID.

* * * * *